Sept. 17, 1957  J. T. KUGLER  2,806,667
ENCAPSULED EJECTION ESCAPE MEANS FOR AIRCRAFT
Filed Nov. 7, 1955  3 Sheets-Sheet 1

INVENTOR.
JOHN T. KUGLER
BY C. G. Stratton
ATTORNEY

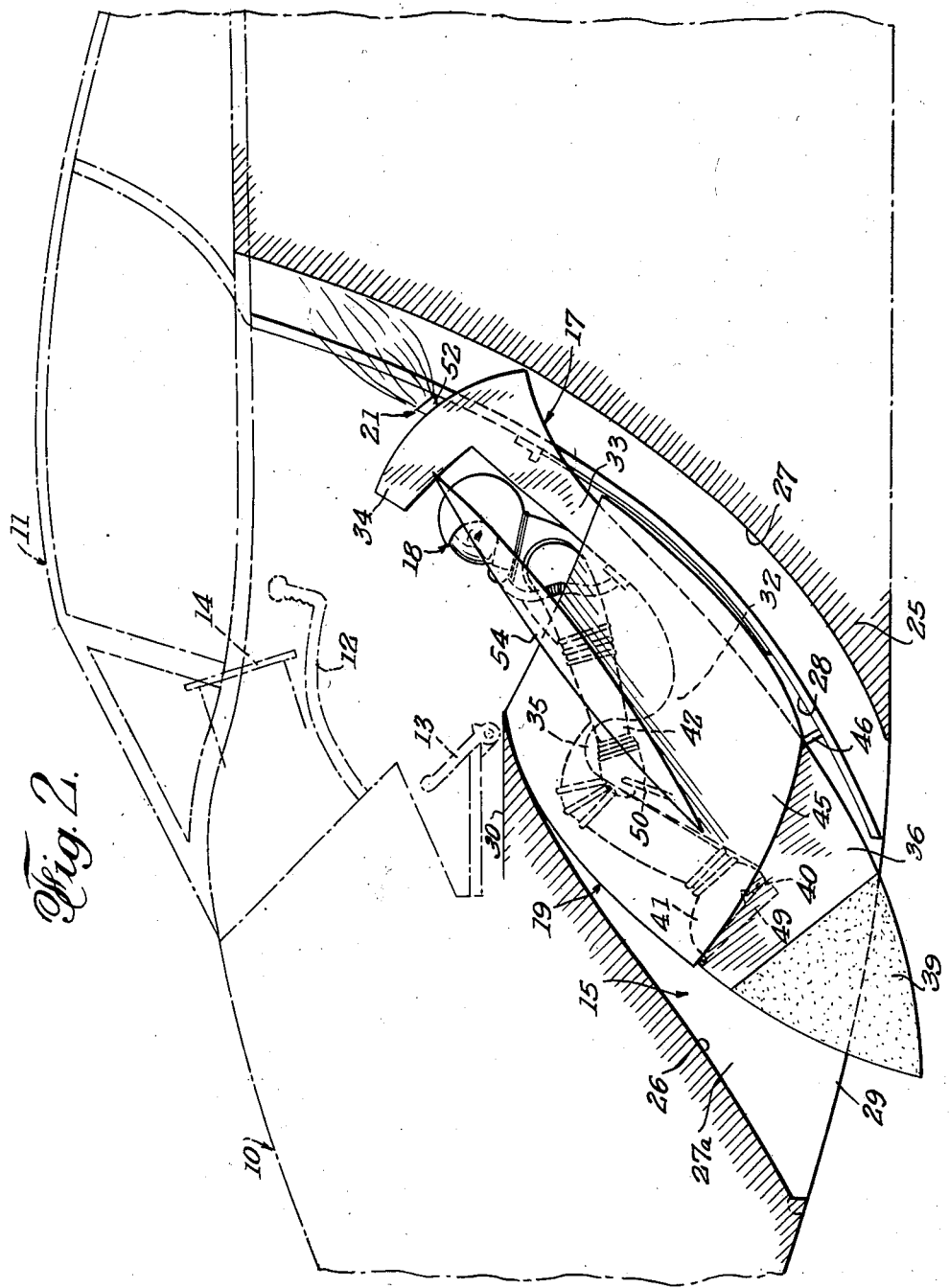

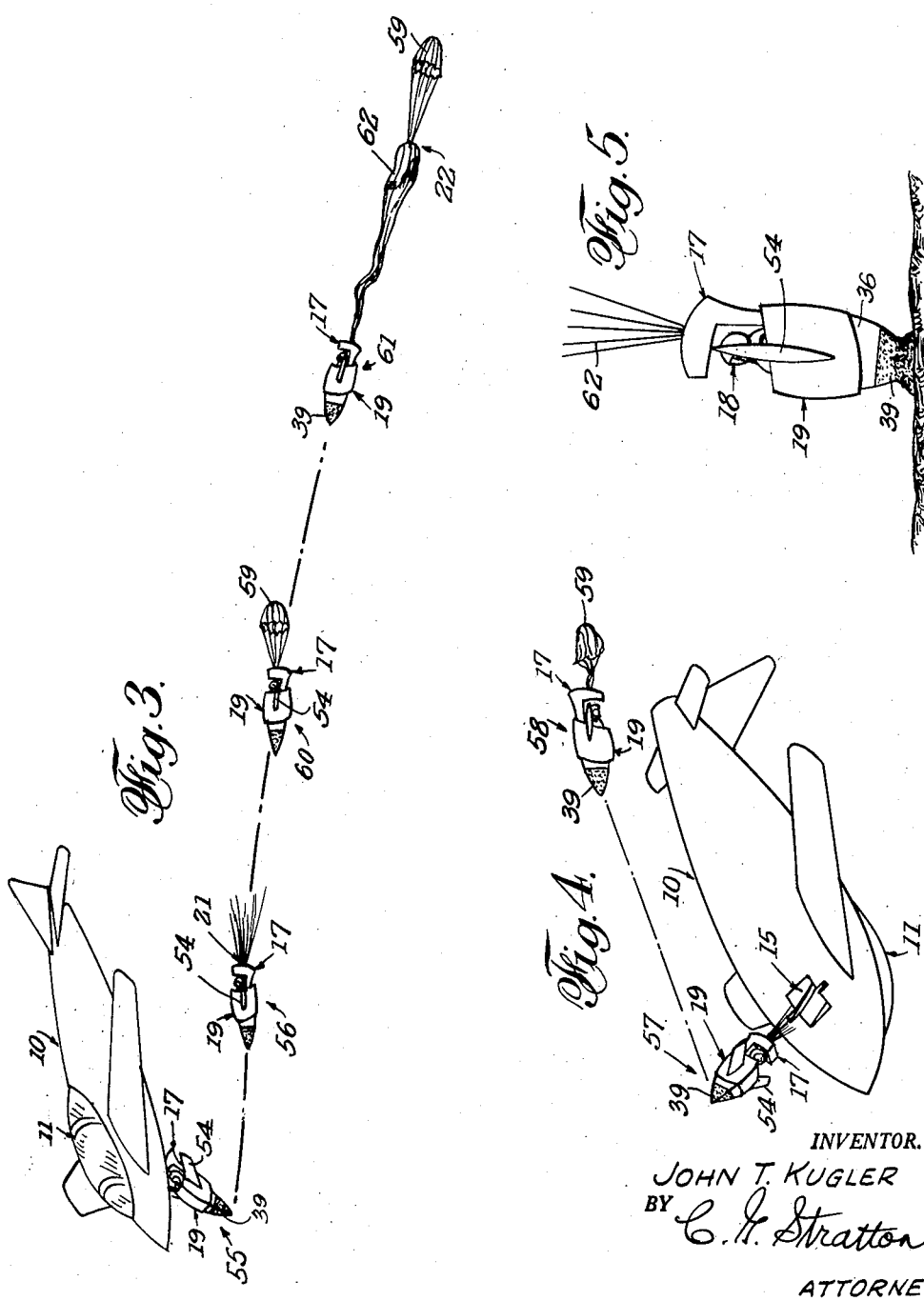

United States Patent Office 2,806,667
Patented Sept. 17, 1957

2,806,667

ENCAPSULED EJECTION ESCAPE MEANS FOR AIRCRAFT

John T. Kugler, Inglewood, Calif., assignor to Air Products Co., Inglewood, Calif., a corporation of California Application November 7, 1955, Serial No. 545,438

5 Claims. (Cl. 244—141)

This invention relates to encapsuled ejection escape means for aircraft.

To the present time, ejection systems for aircraft were not provided as integrated components of such craft but rather as adjuncts that were supplied when required by specification. Since the aircraft were not designed with ejection systems in view, the provision of escape hatches, canopies, etc. were more or less inadequate to provide proper safety for the crew members when resort thereto became necessary. Even aircraft only recently off the production line, although equipped with ejection seats, were not initially designed with such seats, and their ejection means, as an integrated part of the overall design. Thus, several hundred pounds of accessory parts are added wherever there is room for the same, to deleteriously affect the operational efficiency of the craft.

Accordingly, an object of the present invention is to provide escape means of such design that the same is adapted to be incorporated, in encapsuled form, as an initial and integrated component of an aircraft.

Present day aircraft embody a tail fin as one of the control surfaces. Ground clearance requirements dictate that such a fin extend upward from the airplane body rather than downward. Such fins frequently approach thirty or more feet in height. Escape hatches now in use eject the occupant upwardly and, therefore, create the great hazard of the escape means striking such a fin. Also, where canopy ejection is used, the same hazard is present.

Further, it is equally difficult for a pilot, in circumstances where escape from the craft is indicated, to perform a complicated sequence of pre-ejection operations in order to escape. Such operations, at present, in upward ejection, at least include stowing of control stick, moving the feet from the foot controls to clear the wind screen, and jettison the canopy.

Recognizing the above enumerated faults inherent in escape systems that have upward ejection, it is a further object of the invention to provide an encapsuled system of the character referred to that ejects downwardly and, therefore, is enabled to more readily and safely clear the body and outer parts of the aircraft.

A further object of the invention is to provide an encapsuled vehicle adapted to be ejected from an aircraft and, while so ejected, enclosing the occupant for safe movement to the ground while under control of a parachute.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 2 is a similar view showing the encapsuled escape means in the process of being ejected.

Fig. 3 is a panoramic view, to a greatly reduced scale, showing the successive positions of the escape unit as the same is ejected from an airplane in level flight.

Fig. 4 is a similar view showing two successive positions of the escape unit as the same is ejected from an airplane in upside-down flight.

Fig. 5 is a slightly enlarged view of the escape unit in the position assumed when landing on the ground.

Figure 1:
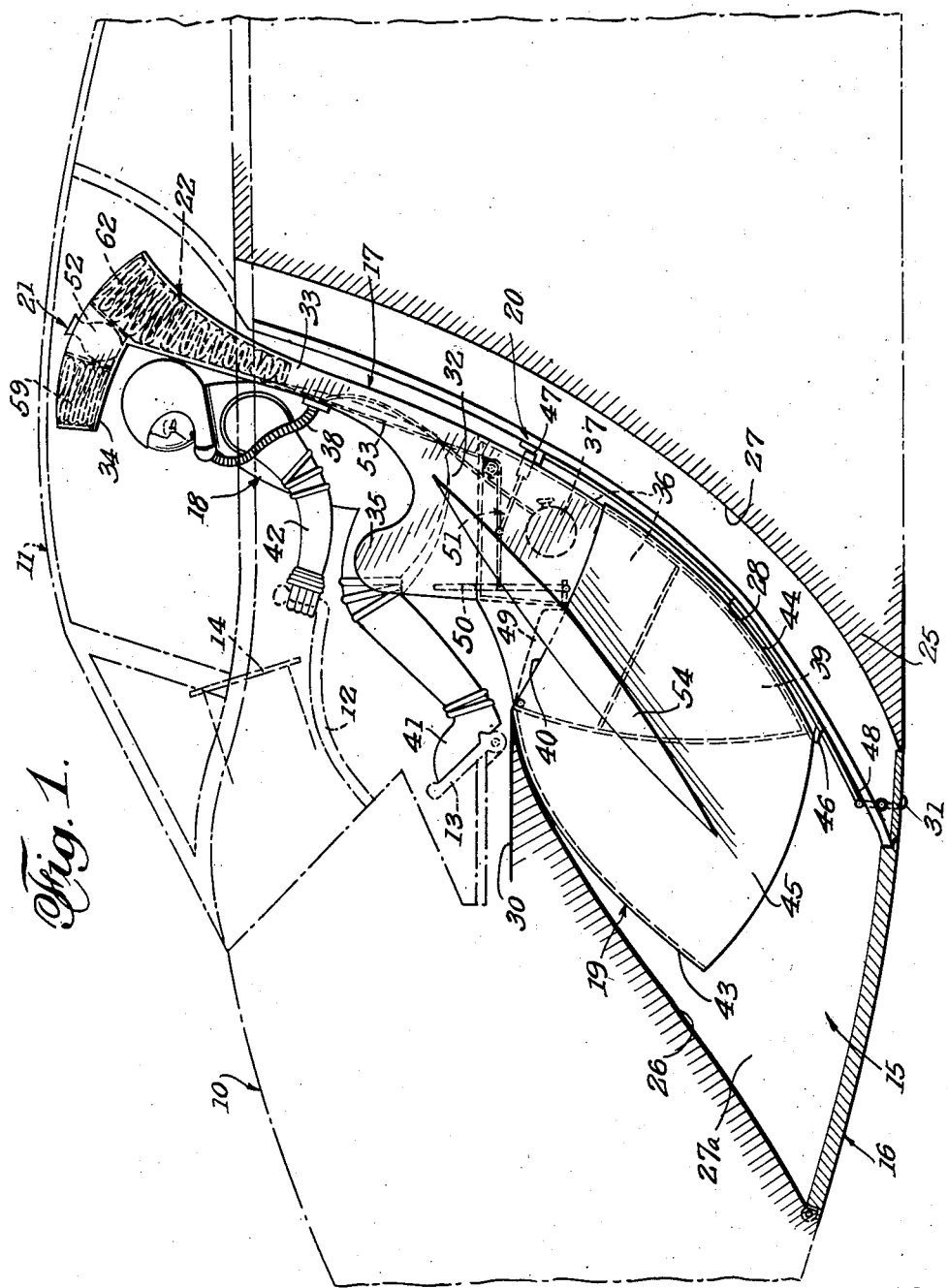
Fig. 1 is a fragmentary longitudinal sectional view of an airplane, the same being provided with the present encapsuled escape means and said means being shown in normal position.

The airplane 10 that is illustrated is shown as provided with an enclosure 11 in the form of a canopy, with the usual controls 12 and 13 and instrument panel 14. The foregoing are only suggestive of typical aircraft design and equipment and are here shown in dot-dash lines to indicate well-known and conventional components of aircraft.

The encapsuled ejection escape means of the present invention comprises, generally, an escape chute 15 built into the airplane, a hatch 16 to enclose the same from beneath, i. e., the end opposite to the canopy, a vehicle 17 for the person 18 being ejected from the airplane, a tubular enclosure 19 telescopically connected to the vehicle to enclose the person 18 in a manner to protect him during ejection and progress to the ground, means 20 controlled by said person 18 to release both the vehicle for ejection and the hatch to open the escape chute, means 21 to propel the vehicle from the chute through the opening that had been closed by the hatch, and parachute means 22 carried by the vehicle 17.

One encapsuled escape means is shown and it will be clear that two or more may be provided in any suitable arrangement, transverse and/or tandem. Each may be independent of the others. Therefore, the above generally-described means is typical.

The escape chute 15 extends from top to bottom of the airplane body 25 and is open to the enclosure 11. Said chute is defined by a forward wall 26, a rearward wall 27, and side walls 27a. In addition, said chute is provided with guides 28 at the rear opposite sides.

The chute is curved downwardly and forwardly from its upper end so that the bottom opening 29 thereof is substantially forward of the upper end. The described curvature is concave as if generated around a point forward of the canopy and slightly above the nose of the airplane.

The forward wall 26 terminates at its upper end at a floor 30 which is approximately on the longitudinal center line of the airplane. It is above and in relation to this floor that the controls 12 and 13 are placed as well as the instrument panel 14. Also, it is with respect to this floor that the vehicle 17 supports a person 18 to be in proper position with relation to said controls and instrument panel.

The hatch 16 is provided to close said opening 29, the same being releasably held as by means 31 which, while shown as a latch, may comprise shearable means or any suitable means that will effect release of the hatch when the same is desired. The hatch release means may include a propulsion device for forcibly ejecting the hatch away from opening 29 to leave the same clear for the vehicle 17. While such propulsion means are not illustrated the same may generally be comparable to the vehicle propulsion means 21 hereinafter described.

The vehicle 17 is shown as comprising a seat portion 32, a back portion 33, and a portion 34 that overstands the head of a person occupying said seat portion. The portion 34 is shown as a forward extension of the back portion. The sides of the seat portion may be enclosed as at 35 and the same may have a lower extension 36 that may be interiorly hollow to provide space to store survival material in kit form and also bail-out oxygen. The latter is represented by a tank 37 and its connection 38 to the high-altitude suit of the person 18.

The above-described vehicle has a substantially erect position in the upper part of escape chute 15, the portion 34 extending into the airplane canopy 11 so that the person in said vehicle has proper visibility through the windows of said canopy. At its lower end, said vehicle is provided with a shock absorber 39 that is shown in the form of low density foam rubber or like spongy material so as to readily compress (see Fig. 5). Said shock absorber may be tapered toward its lower end to offer minimum resistance to movement of the vehicle from the chute. Between seat part 32 and the survival kit-storing extension 36, the forward portion of said vehicle may have a floor 40 that constitutes a rearward extension of the airplane floor 30. Floor 40 is of a size amply to accommodate the feet 41 of the person in the vehicle 17.

It will be noted from Fig. 1 that the arm or arms 42 of a person in the vehicle are in proper relationship to the control 12 while the feet 41 are in proper relationship to control 13, enabling convenient control of the aircraft by said person. It will be also noted that said person has freedom of movement of hands and feet for such control and, also, that the same extend forwardly from the general confines of the vehicle, as well as the chute 15.

The tubular enclosure 19 is normally positioned in the chute 15 below the floor 30 and the extension 40 that is provided on the vehicle 17. Said enclosure is shown with a front wall 43, a rear wall 44 and side walls 45 and is so formed as to substantially fit the chute 15 and be of such size and shape as to fit over the portions 32 and 36 of the vehicle and the lower part of vehicle portion 33. In other words, the enclosure 19 is of such vertical extent that when assuming the position of Fig. 2, the same encloses the person in the vehicle with the exception of the head and the shoulders.

Said enclosure 19 is releasably held in chute 15 as by means that may comprise a latch and is here shown as a shear bolt 46. Being thus held stationary, while the vehicle is being moved toward the ejection end of the chute, said enclosure 19, itself, constitutes a temporary chute for the vehicle and, after assuming the person-shrouding position above described, becomes part of and moves toward ejection with the vehicle 17.

The means 20 is shown as a latch 47 that releasably connects the vehicle 17 and a wall of the chute, such as one of the guides 28. In any case, the latch 47 is typical of means to hold the vehicle in the position of Fig. 1 until released. The means 20 also includes a controlled connection 48 to the latch 31 or other means for holding the hatch 16 in place.

In order to obviate accidental operation of the means 20, the same further comprises a foot-operated control 49 and a hand-operated control 50. The former control is provided to effect release of the control 50 and the latter may be operatively connected to release latches 31 and 47, as by means of operating connection 51. It will be realized that the control means may take various forms and may be power-operated, as desired.

The vehicle-propelling means 21 may comprise a rocket-type of device 52 carried by the vehicle part 34 and arranged to exert its thrust upward so as to propel the vehicle downward. Since ejection may become necessary when the airplane is upside-down, the term upward is intended as meaning toward the canopy 11 and the term downward toward the chute opening 15. As shown in Fig. 1, the rocket 52 may be triggered by the control 50 through suitable connections 53 and the thrust thereof becomes effective to drive the vehicle, first, into the enclosure 19 to achieve the position of Fig. 2 and, then, together with the enclosure, through the chute opening 15.

It will be noted that, in order to control the means 20, the person in the vehicle must release the controls 12 and 13 and withdraw the hands and feet in such manner that the enclosure may readily assume its protective position. Since the person 18 is safely enclosed in the manner indicated nad, providing a safety belt is employed to hold him in his seat, assurance is had that his passage outwardly of the chute will be effected with safety.

In order to obviate the encapsuled vehicle and person spinning after release from the airplane, the same may be provided with wings, fins or other suitable stabilizer surfaces 54, the same being shown in the drawings as carried by the enclosure 19. In fact, these members 54 may be designed to provide the vehicle with aerodynamic surfaces that not only stabilize but serve as air supports when the vehicle is in horizontal or substantially horizontal position.

It will be understood that the vehicle 17 is propelled in a forward as well as a downward direction and, with the airplane from which released in normal flight or even in a dive, as in Fig. 3, the vehicle assumes the position 55. This downward and forward movement, being under propulsion of the rocket 52, causes translation of movement to a more nearly horizontal position, as at 56. The surfaces 54 have a large influence on such change of direction.

When the airplane is upside-down, as in Fig. 4, the vehicle 17 is propelled forward as before but, in this case, upward rather than downward, as at 57. Again the surfaces 54 will help bring the vehicle to a horizontal position with the person therein facing downward as at 58.

At this stage of ejection, the person in the vehicle may effect release of the parachute means 22 in the ordinary and well-known manner of pulling a rip cord or the control means 20 may include a timed mechanism that will release the drogue parachute 59 stowed in the top portion 34 of the vehicle. An alternative means of release of the drogue parachute is to have the first part of the movement of control 50 set into operation the ejection and propulsion mechanism and a subsequent movement, perhaps in another direction, effect release of the drogue parachute.

At this latter stage, as shown in Fig. 3 at 60, the vehicle is quite clear of the airplane but yet partakes of some of the rapid speed at which the airplane is traveling. The drag on parachute 59 now becomes effective, as shown at 61, to pull the main parachute 62 out of its stowage compartment in the vehicle. This larger parachute will, in the usual manner, sharply arrest the forward motion of the vehicle and the latter will eventually assume a pendent position with the person therein vertically disposed. Said main parachute will, of course, also arrest the speed of descent of the vehicle and, as shown in Fig. 5, the same will be in position to strike the ground with the shock absorber 39. The latter is shown in th cerlecumpodn absorber 39. The latter is shown in the crumpled condition resulting from the landing force, the shock being, in a large measure, absorbed in the absorber.

A water landing may be safely effected since the vehicle can be made to be buoyant and maintain a vertical disposition because of the low density end 39.

The present escape means may be safely operated at both high and low altitude or, at least, at those altitudes where use of a parachute is feasible. Only known techniques need be applied to the present means to enable safe operation under all practical conditions.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. Encapsuled ejector escape means comprising, in combination, a downward and forward curved chute provided in an airplane, a person-carrying vehicle in the upper part of the chute and formed to move forwardly through the end of the chute opening on the airplane bottom, and a protective enclosure releasably held in the chute, the mentioned vehicle being movable with respect to the enclosure to bring the person therein from a position entirely above the enclosure to a position at least partly enclosed thereby and to move outwardly from the chute.

2. Encapsuled ejector escape means comprising, in combination, a downward and forward curved chute provided in an airplane, a person-carrying vehicle in the upper part of the chute and formed to move forwardly through the end of the chute opening on the airplane bottom, and a protective enclosure releasably held in the chute, the mentioned vehicle being movable with respect to the enclosure to bring the person therein from a position entirely above the enclosure to a position at least partly enclosed thereby and to move outwardly from the chute, said enclosure being provided with means constituting stabilizing surfaces when the vehicle has moved out of the chute.

3. Encapsuled ejector escape means comprising, in combination, a downward and forward curved chute provided in an airplane, a person-carrying vehicle in the upper part of the chute and formed to move forwardly through the end of the chute opening on the airplane bottom, and a protective enclosure releasably held in the chute, the mentioned vehicle being movable with respect to the enclosure to bring the person therein from a position entirely above the enclosure to a position at least partly enclosed thereby and to move outwardly from the chute, said enclosure being provided with means constituting stabilizing surfaces when the vehicle has moved out of the chute, said latter means extending laterally from the sides of the enclosure.

4. Encapsuled ejector escape means comprising, in combination, a downward and forward curved chute provided in an airplane, a person-carrying vehicle in the upper part of the chute and formed to move forwardly through the end of the chute opening on the airplane bottom, means releasably latching the vehicle in the chute, and a protective enclosure releasably held in the chute, the mentioned vehicle being movable with respect to the enclosure to bring the person therein from a position entirely above the enclosure to a position at least partly enclosed thereby and to move outwardly from the chute.

5. Encapsuled ejector escape means comprising, in combination, a downward and forward curved chute provided in an airplane, a person-carrying vehicle in the upper part of the chute and formed to move through the end of the chute opening on the airplane bottom, means releasably latching the vehicle in the chute, and a protective enclosure releasably held in the chute, the mentioned vehicle being movable with respect to the enclosure to bring the person therein from a position entirely above the enclosure to a position at least partly enclosed thereby and to move outwardly from the chute propulsion means carried by the vehicle to move the latter when released by the latching means.

References Cited in the file of this patent
UNITED STATES PATENTS

| | | |
|---|---|---|
| 2,457,205 | Campbell et al. | Dec. 28, 1948 |
| 2,699,305 | Turner et al. | Jan. 11, 1955 |
| 2,749,065 | Soule | June 5, 1956 |